United States Patent [19]

Saunders

[11] Patent Number: 4,581,293
[45] Date of Patent: Apr. 8, 1986

[54] COATING POWDER

[75] Inventor: Howard E. Saunders, Murrysville Boro, Pa.

[73] Assignee: Westinghouse Electric Corp., Pittsburgh, Pa.

[21] Appl. No.: 698,334

[22] Filed: Feb. 5, 1985

[51] Int. Cl.$^4$ .................. C08K 3/34; B32B 27/38
[52] U.S. Cl. .................. 428/413; 427/185; 427/386; 428/416; 523/443; 523/454; 523/466
[58] Field of Search ............. 525/119, 122; 427/185; 428/416, 413; 523/443, 466, 454

[56] References Cited

U.S. PATENT DOCUMENTS

| | | | |
|---|---|---|---|
| 2,888,541 | 5/1959 | Netzer | 523/466 |
| 2,997,776 | 8/1961 | Matter et al. | 427/185 |
| 3,316,195 | 4/1967 | Grosner et al. | 523/444 |
| 3,655,818 | 4/1972 | McKown | 428/416 |
| 3,894,113 | 7/1975 | Pagel | 525/122 |
| 4,040,993 | 8/1977 | Elbling et al. | 523/427 |
| 4,476,285 | 10/1984 | Crabtree et al. | 525/119 |

Primary Examiner—Lewis T. Jacobs
Attorney, Agent, or Firm—R. D. Fuerle

[57] ABSTRACT

Disclosed is an epoxy rubber made by reacting about 5 to about 50% of an epoxy terminated acrylonitrilebutadiene copolymer with about 50 to about 95% of a solid epoxy resin. A coating powder is prepared with about 30 to about 70% of a solid epoxy resin, about 2 to about 25% of the epoxy rubber, about 5 to about 25% of an anhydride curing agent, about 5 to about 40% mica filler, and about 10 to about 50% glass fiber. Electrical apparatus, such as coils made of served wire, can be coated with the powder by heating the apparatus above the melting point of the powder and dipping it in the fluidized powder, followed by curing the melted powder on the apparatus.

17 Claims, 2 Drawing Figures

COATING POWDER

BACKGROUND OF THE INVENTION

At the present time, form-wound stator coils for elevated temperature use are made from served wire which is formed into coils, then wrapped with mica tape. The coils are impregnated with a resin, typically by a vacuum-pressure impregnation (VPI) technique. This method, while producing excellent coils, is nevertheless slow, labor intensive, and expensive. Great benefits could be realized if a technique and a material could be developed that would enable coils of various sizes and configurations to be coated in an automatic or semi-automatic fashion with insulation that had properties adequate to meet the stringent electrical and mechanical requirements for stator coils.

SUMMARY OF THE INVENTION

We have discovered a method of making a coating powder for insulating electrical apparatus. The coating powder of this invention is prepared from a composition which employs an epoxy rubber that is the reaction product of a carboxy terminated acrylonitrile butadiene copolymer and a solid epoxy resin. The resulting coating, when cured, has superior electric properties, including electric strength, voltage endurance, and dissipation factor. It also has good physical properties, including humidity/moisture resistance and windability (flexibility). Finally, the coating is superior to other powder coatings in its thermal endurance, and its thermal cycling/thermal shock resistance.

DESCRIPTION OF THE INVENTION

Figure 1:
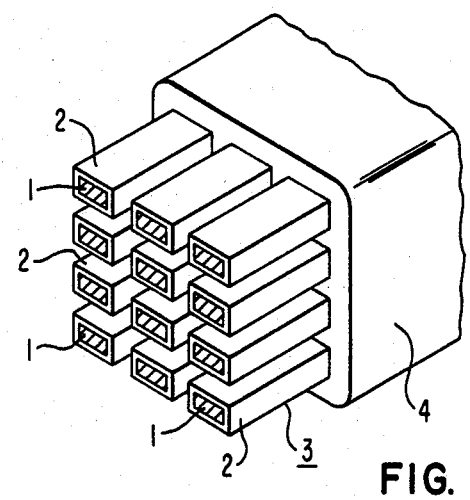
FIG. 1 is an isometric view partially in section showing a certain presently preferred embodiment of a coil of served wire insulated according to this invention.

In FIG. 1, conductors 1 are insulated with wire insulation 2 and formed into coil 3. Coil 3 is then coated with insulation 4 according to the method of this invention.

In the first step of the process of making a coating powder according to this invention, an epoxy rubber is prepared by reacting about 5 to about 50% (all percentages herein are by weight) of a carboxy terminated butadiene-acrylonitrile copolymer (CTBN) with about 50 to about 95% of a solid epoxy resin, based on total epoxy rubber weight. If less than 5% of the CTBN is used it has no beneficial affect on the resulting insulation, and if more than 40% CTBN is used the epoxy rubber product is too sticky to be ground and worked with. The best properties are obtained with about 25 to about 35% of the CTBN and about 65 to about 75% of the solid epoxy resin.

Only acrylonitrile and butadiene are suitable in this invention for use in preparing the epoxy rubber used in this invention. The butadiene-acrylonitrile copolymer should be about 5 to about 30% acrylonitrile and about 70 to about 95% butadiene, and is preferably about 10 to about 26% acrylonitrile—and about 74 to about 90% butadiene. The acrylonitrile butadiene copolymer must be carboxy terminated in order to react with the epoxy resin. The carboxy functionality of the resin has a theoretical maximum of 2.0. Functionalities of 1.1 to 2.0 are acceptable, with values greater than 1.8 being preferred. Carboxy values less than 1.1 will result in incomplete reaction of the copolymer with the epoxy resin. The CTBN is a commercially available product.

The epoxy resin used in preparing the epoxy rubber must be a solid at room temperature, but any type of epoxy resin can be used including cycloaliphatics, diglycidyl ethers of bisphenol A or bisphenol F, novalacs, and hydantoins. Diglycidyl ethers of bisphenol A (DGEBA) are preferred as they produce the best properties.

The reaction of the CTBN with the epoxy resin can occur at a temperature of about 80° to about 100° C. for about 2 to about 5 hours; higher temperatures requires shorter reaction times but may result in charring. An epoxycarboxyl catalyst such as triphenylphosphite, a tertiary amine, stannous octoate, or a polyhydric phenol is required for this reaction. The preferred epoxy-carboxyl catalyst is triphenylphosphite as it has been found to work well.

The resulting epoxy rubber, when cooled, is a solid friable reaction product. It is then crushed and ground, preferably to a diameter of a ¼ inch or less. It should have an epoxy equivalent weight (E.E.W.) of about 1000 to about 3000, with a preferred E.E.W. of about 1500 to about 2500, an acid value between 0 and 0.5, and a softening point of about 75° to about 100° C. No solvent must be present in any of the reactants or in the product, as once solvent is present it is extremely difficult to entirely remove, and residual solvent adversely affects the properties of the insulation.

In the next step of the process of this invention, a coating powder is prepared of about 30 to about 70% of a second solid epoxy resin, about 5 to about 35% of the epoxy rubber, about 5 to about 25% of an anhydride curing agent, about 5 to about 40% mica filler, and about 10 to about 50% glass fibers. The second solid epoxy resin used in this composition need not be the same epoxy resin that was used in preparing the epoxy rubber, although preferably it is the same. Any anhydride curing agent can be used, although preferably the anhydride curing agent is a cyclic non-aromatic monoanhydride as they produce a more flexible product. Suitable monoanhydrides include hexahydrophthalic anhydride, tetrahydrophthalic anhydride, and phthalic anhydride. Non-monoanhydrides, such as trimellitic anhydride or polyazelaic polyanhydride, can also be used. The preferred anhydride is tetrahydrophthalic anhydride as it results in a more flexible product. An optional ingredient is about 0.01 to about 5% of an accelerator for the anhydride curing agent. The preferred amount of accelerator is about 0.1 to about 1%, and the preferred accelerator is a quaternary phosphonium salt. Other accelerators that can be used include stannous octoate, tertiary amines such as benzyldimethylamine, quaternary phosphonium salts, and fluoroborates.

The mica filler must be present if the resulting insulation is to have adequate voltage endurance. It may be used as a flake or as a powder and may be either natural or synthetic, with or without surface treatment such as silanes. Mica particles up to ¼ inch in diameter may be used, although the preferred size is finer than 325 mesh. The preferred amount of the mica particles is in the range of about 10 to about 30%.

The glass fibers are preferably continuous glass filaments hammer milled into lengths between 1/16 inch and ¼ inch with a nominal fiber diameter of about 0.0051 inches. The amount of glass fiber is preferably in the range of about 10 to about 30%.

In addition, the coating powder may contain certain optional components such as about 1 to about 10% of a pigment, about 0.2 to about 5% of a flow control agent such as a polyacrylate or silicon, about 0.5 to about 10% benzoin, which acts as a leveling agent, and about 0.2 to about 5% by weight of an antioxidant such as octadecyl 3-(3',5'-di-tert-butyl-4'hydroxyphenyl)propionate or tetrakis[methylene3-(3',5'-di-tert-butyl-4'-hydroxyphenyl)propionate]methane.

After the components of the coating powder are mixed, they are crushed and ground to a particle size of preferably less than about 200 microns. The application of the coating powder to a coil of insulated wire or other electrical apparatus can be accomplished in several ways. The preferred method of application is to heat the coil or electrical apparatus above the melting point of the coating powder and dip the heated part into a fluidized bed of the coating powder. The temperature required to melt and flow the coating powder will depend on the particular components used in preparing the coating powder, but this temperature is, generally speaking, between 100° and 200° C., and is usually between about 125° and 190° C. When the hot coil or electrical apparatus contacts the coating powder in the fluidized bed, the coating powder will melt and flow to cover the electrical apparatus to a thickness which depends upon the thermal capacity of the coil or apparatus, its weight, and the length of time that it remains in the fluidized bed. The coil or apparatus is then removed and heated to cure the melted coating on it. The cure time and temperature will again depend upon the particular composition used. The coating powder can also be applied in other ways, such as by electrostatic spray gun.

The following examples further illustrate this invention.

EXAMPLE 1

Preparation of Epoxy Rubber

The following composition was prepared:
50 parts by weight pbw solid DGEBA resin having an E.E.W. of 575–700 sold by Shell Chemical Company under the trade designation "Epon 662,"
22 pbw solid DGEBA resin having an E.E.W. of 875 to 1025 sold by Shell Chemical Company under the trade designation "Epon 1004,"
31 pbw CTBN having a molecular weight of 3500, an acrylonitrile content of 17%, a Brookfield viscosity of 125,000 cps at 27° C., and a specific gravity of 0.9 for a carboxyl functionality of 1.85, sold by B. F. Goodrich Company under the trade designation "Hycar CTBN (1300 X8)," and
0.06 pbw triphenylphosphite catalyst.

The composition was reacted for 6 hours at 100° C. and the product was cooled, crushed, and chipped.

EXAMPLE 2

Five coating powders were prepared which had the following composition:

| Ingredients | Formulation 1 | 2 | 3 | 4 | 5 |
|---|---|---|---|---|---|
| Solid DGEBA resin having an E.E.W. of 575 to 700, sold by Dow Chemical Co. as "DER 662." | 44.4 | | | | |
| Solid DGEBA resin having an E.E.W. of 875 to 1025, sold by Shell Chemical Co. as "Epon 1004." | 22.2 | | | | |
| Solid DGEBA resin having an E.E.W. of 2000 to 2500, sold by Shell Chemical Co. as "Epon 1007." | | 48.1 | 48.1 | 53.9 | 45.7 |
| Epoxy rubber from Example 1 | | 5.8 | 5.8 | | 5.5 |
| Trimellitic anhydride | | 10.8 | 10.8 | 10.8 | |
| Tetrahydrophthalic anhydride | | | | | 8.0 |
| Dicyandiamide | 4.7 | | | | |
| Tributyl tin acetate | | 0.05 | 0.05 | 0.05 | 0.02 |
| Catechol | | 0.5 | 0.5 | 0.5 | |
| Proprietary accelerator sold by Cordoba Chemicals, and believed to be a mixture of tertiary amines | | 0.25 | 0.25 | 0.25 | |
| Mica (325 mesh) | | 32.5 | 10.8 | 10.8 | 15.4 |
| Glass fibers | 26.7 | | 21.7 | 21.7 | 20.5 |
| Yellow pigment | 2.0 | 1.9 | 1.9 | 1.9 | 1.8 |

Of the above compositions, Formulations 1, 2, and 4 are outside the scope of this invention due to the absence of mica, anhydride curing agent, glass fibers, and epoxy rubber, respectively. The compositions were ground to a particle size of less than 200 microns. The following table gives the some of the properties of the coating powder compositions, and gives a comparison with a commercial coating powder.

| Formulation | Cure (°C./Min) | Breakdown (kV) | Porosity | Dissipation Factor (1 kV,155° C.) | Voltage Endurance (hr) | Flexibility | Thermal Cycling Resistance |
|---|---|---|---|---|---|---|---|
| 1 | 180/60 | — | Small | 10 | 63,77,98,207 | Good | Good |
| 2 | 180/30 | 40 | High | — | — | Poor | Poor |
| 3 | 180/30 | 38 | Small | 0.74 | — | Good | Good |
| 4 | 180/30 | — | Small | 0.53 | — | Poor | Good |
| 5 | 180/30 | — | Small | 1.27 | 1323,1427 1460,2469 | Good | Good |
| Commercial Coating Powder | 180/30 | — | Small | 2.90 | 784,785 767,753 | Good | Poor |

Figure 2:
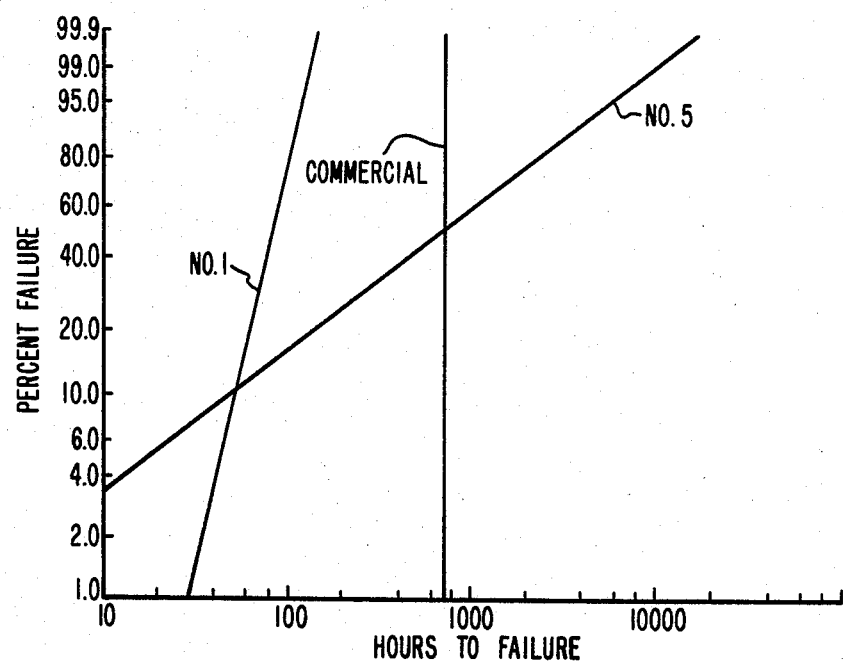
FIG. 2 is a graph which presents experimental results discussed in Example 2.

The above table shows that the compositions of this invention, Formulations 3 and 5, were superior to the other compositions in most respects. The commercial powder, Formulations 1 and 5, and a mica tape VPI system insulation were tested for voltage endurance at 23° C. and 240 V/mil stress. FIG. 2 gives the results and shows that coating powder formulation No. 5 was superior to both coating powder formulation No. 1 and to the commercial coating powder formulation, and was as good as the VPI insulation at a 60% failure level. These results are especially significant as the abscissa in FIG. 2 is on a logarithmic scale.

EXAMPLE 3

Moisture Resistance

Various powders were coated onto 18 inch long U-shaped rectangular copper bars 0.125 inches by 0.75 inches. Five bars were used to test each powder. Four coils of glass served wire wrapped with mica-polyethylene terephthalate tape, impregnated with a polyester resin using a vacuum-pressure impregnation technique (VPI), were included in the moisture resistance test for comparison.

The samples were immersed to 80% of their lengths in a 5% aqueous saline solution and 1330 volts AC were applied across the insulation of the sample. The following table gives the hours until the insulation failed.

| | HOURS TO FAILURE | | |
| --- | --- | --- | --- |
| Formulation 5 (Example 2) | Commercial Powder | Formulation 1 (Example 2) | VPI Coil |
| 1217 | 2148 | 1270 | 83 |
| 7034 | 2148 | 1105 | 12 |
| 7368 | 1299 | 1037 | 899 |
| 3327 | 1466 | 1490 | 899 |
| 6415 | 730 | — | — |

The above table shows that the coating powder of this invention, Formulation 5, was clearly superior in moisture resistance.

I claim:

1. A coating powder comprising:
   (1) about 5 to about 35% of an epoxy rubber which comprises the solventless reaction product of about 5 to about 50% of a solventless carboxy terminated acrylonitrile-butadiene copolymer with about 50 to about 95% of a first solid epoxy resin;
   (2) about 30 to about 70% of a second solid epoxy resin;
   (3) about 5 to about 25% of an anhydride curing agent;
   (4) about 5 to about 40% mica filler; and
   (5) about 10 to about 50% glass fibers.

2. A coating powder according to claim 1 wherein said first and second solid epoxy resins are the same.

3. A coating powder according to claim 1 wherein said anhydride curing agent is a monoanhydride.

4. A coating powder according to claim 3 wherein said monoanhydride is tetrahydrophthalic anhydride.

5. A coating powder according to claim 1 which includes about 0.2 to about 5% of a flow control agent.

6. A coating powder according to claim 1 which includes about 0.5 to about 10% benzoin.

7. A coating powder according to claim 1 which includes about 0.2 to about 5% of an antioxidant.

8. A coating powder according to claim 1 which includes about 1 to about 10% of a pigment.

9. A coating powder according to claim 1 wherein said mica filler is finer than 325 mesh.

10. A coating powder according to claim 1 ground to a particle size of less than about 200 microns.

11. A coating powder according to claim 1 comprising:
    (1) about 40 to 60% of said second solid epoxy resin;
    (2) about 5 to about 15% of said epoxy rubber;
    (3) about 5 to about 15% of said anhydride curing agent;
    (4) about 10 to about 30% of said mica filler; and
    (5) about 10 to about 30% of said glass fibers.

12. A coating powder according to claim 1 which includes about 0.01 to about 5% of an accelerator for said anhydride curing agent.

13. A coating powder according to claim 12 wherein said accelerator is about 0.1 to about 1% of a quaternary phosphonium salt.

14. A method of insulating a coil of served wire comprising:
    (A) fluidizing a coating powder according to claim 1;
    (B) heating said coil above the melting point of said coating powder;
    (C) dipping said heated coil into said fluidized coating powder so that said coating powder melts over said coil; and
    (D) curing said melted coating powder on said coil.

15. An electrical apparatus coated with a cured coating powder according to claim 1.

16. An insulated coil coated with a cured coating powder according to claim 1.

17. A method of making a coating powder comprising:
    (A) preparing an epoxy rubber by reacting
        (1) about 5 to about 50% of a solventless carboxy terminated acrylonitrile-butadiene copolymer with
        (2) about 50 to about 95% of a first solid epoxy resin;
    (B) preparing a composition which comprises:
        (1) about 30 to about 70% of a second solid epoxy resin;
        (2) about 5 to about 35% of said epoxy rubber;
        (3) about 5 to about 25% of an anhydride curing agent;
        (4) about 5 to about 40% mica filler; and
        (5) about 10 to about 50% glass fibers; and
    (C) comminuting said composition to form said coating powder.

* * * * *